US012695890B2

(12) United States Patent
Han et al.

(10) Patent No.: US 12,695,890 B2
(45) Date of Patent: Jul. 28, 2026

(54) VIDEO DATA PROCESSING TECHNOLOGY FOR REDUCING TRANSMISSION BANDWIDTH

(71) Applicant: HANWHA VISION CO., LTD., Seongnam-si (KR)

(72) Inventors: Seungyeon Han, Seongnam-si (KR); Gwangwhoon Jang, Seongnam-si (KR); Seonghee Kim, Seongnam-si (KR)

(73) Assignee: Hanwha Vision Co., Ltd., Seongnam-si (KR)

( * ) Notice: Subject to any disclaimer, the term of this patent is extended or adjusted under 35 U.S.C. 154(b) by 6 days.

(21) Appl. No.: 18/769,461

(22) Filed: Jul. 11, 2024

(65) Prior Publication Data

US 2025/0024054 A1     Jan. 16, 2025

(30) Foreign Application Priority Data

Jul. 12, 2023     (KR) ........................ 10-2023-0090648

(51) Int. Cl.
| | |
|---|---|
| *H04N 19/23* | (2014.01) |
| *H04N 7/18* | (2006.01) |
| *H04N 19/119* | (2014.01) |
| *H04N 19/124* | (2014.01) |
| *H04N 19/136* | (2014.01) |
| *H04N 19/172* | (2014.01) |

(52) U.S. Cl.
CPC ............ *H04N 19/23* (2014.11); *H04N 7/183* (2013.01); *H04N 19/119* (2014.11); *H04N 19/124* (2014.11); *H04N 19/136* (2014.11); *H04N 19/172* (2014.11)

(58) Field of Classification Search
CPC .... H04N 19/23; H04N 19/119; H04N 19/124; H04N 19/136; H04N 19/172; H04N 7/183
USPC ......................................... 348/143
See application file for complete search history.

(56) References Cited

U.S. PATENT DOCUMENTS

| | | |
|---|---|---|
| 2009/0238411 A1 | 9/2009 | Adiletta |
| 2010/0124274 A1 | 5/2010 | Cheok |
| 2012/0169923 A1 | 7/2012 | Millar et al. |

(Continued)

FOREIGN PATENT DOCUMENTS

| | | |
|---|---|---|
| EP | 4195166 A1 | 6/2023 |

OTHER PUBLICATIONS

European Search Report issued on Dec. 18, 2024 for EP Application 24188334.7.

(Continued)

*Primary Examiner* — Allen C Wong
(74) *Attorney, Agent, or Firm* — McLean IP Global; Jason Y. Pahng

(57) ABSTRACT

Provided is a method for processing video data. The method includes storing data of a video captured by a camera, selecting one or more video frames from among a plurality of video frames constituting at least a portion of the stored video data, dividing the one or more selected video frames into a plurality of sub-regions, and arranging the plurality of sub-regions according to a predetermined arrangement order and generating a sub-video stream, which includes the plurality of arranged sub-regions as a plurality of sub-video frames.

18 Claims, 11 Drawing Sheets

(56)     References Cited

U.S. PATENT DOCUMENTS

| 2016/0094801 | A1* | 3/2016 | Beysserie | ............. | H04N 5/915 |
| | | | | | 386/226 |
| 2017/0200315 | A1 | 7/2017 | Lockhart | | |
| 2018/0115788 | A1* | 4/2018 | Burns | ................... | G06V 20/52 |
| 2019/0261066 | A1 | 8/2019 | Jeong et al. | | |
| 2020/0228837 | A1* | 7/2020 | Song | ................... | H04N 21/816 |
| 2020/0265567 | A1* | 8/2020 | Hu | ........................... | G06N 3/09 |
| 2021/0142070 | A1 | 5/2021 | Scanlon et al. | | |
| 2021/0352303 | A1 | 11/2021 | Buettner et al. | | |
| 2021/0385463 | A1* | 12/2021 | Guruva reddiar | ... | H04N 19/176 |
| 2023/0040513 | A1* | 2/2023 | Ryan | ..................... | G06V 10/25 |

OTHER PUBLICATIONS

European Search Report issued on Feb. 20, 2026 for EP Application 24188334.7.

* cited by examiner

Video encoding

Video encoding

Background

Video Encoding

Foreground

Video Encoding

VIDEO DATA PROCESSING TECHNOLOGY FOR REDUCING TRANSMISSION BANDWIDTH

CROSS-REFERENCE TO RELATED APPLICATION

This application claims priority to and the benefit of Korean Patent Application No. 10-2023-0090648, filed on Jul. 12, 2023, the disclosure of which is incorporated herein by reference in its entirety.

BACKGROUND

1. Field of the Invention

The present disclosure relates to a video data processing technology for reducing a transmission bandwidth.

2. Discussion of Related Art

Closed-circuit televisions (CCTVs) are increasingly installed for video surveillance and security, and CCTV systems equipped with Internet Protocol (IP) cameras and network video recorder (NVR) servers or video management system (VMS) servers are increasing. A CCTV system includes at least one camera that captures videos, a digital video recorder (DVR) or NVR that is connected to at least one camera with unshielded twisted pair (UTP) cables to compress and store video data from each camera, and a storage device connected to the DVR or NVR, and the CCTV system transmits videos from each camera channel to a monitoring server or an administrator terminal through a network.

As the resolution of CCTV cameras increases, the size of transmitted video data increases, and broadband transmission bandwidths are required to transmit such large amounts of video data. Further, there is no problem in regions where broadband wired and wireless networks are provided, but it is still difficult to transmit large amounts of video data in regions where such broadband wired and wireless networks are not provided, and thus it is necessary to introduce a technology for reducing transmission bandwidths in these regions.

SUMMARY OF THE INVENTION

The present disclosure is directed to providing a technology capable of reducing a transmission bandwidth when video data of a closed-circuit television (CCTV) camera is transmitted.

The present disclosure is also directed to providing a technology capable of providing a detailed video through a reduced transmission bandwidth according to a user request when video data of a CCTV camera is transmitted.

According to an aspect of the present disclosure, there is provided a video data processing method. The video data processing method includes storing data of a video captured by a camera, selecting one or more video frames from among a plurality of video frames constituting at least a portion of the stored video data, dividing the one or more selected video frames into a plurality of sub-regions, and arranging the plurality of sub-regions according to a predetermined arrangement order and generating a sub-video stream, which includes the plurality of arranged sub-regions as a plurality of sub-video frames.

The video data processing method may further include transmitting the generated sub-video stream to a monitoring server.

In the selecting of the one or more video frames from among the plurality of video frames, the selected video frame may include one or more best shots, and the best shot may include an image of an object with a highest object identification score calculated based on a size of a region occupied by the object and an orientation and sharpness of the object.

In the selecting of the one or more video frames from among the plurality of video frames, the selected video frame may include one or more event detection shots, and the event detection shot may include an image captured upon detecting a preset event.

In the selecting of the one or more video frames from among the plurality of video frames, the selected video frame may include a plurality of video frames captured at predetermined time intervals.

The plurality of sub-regions may be classified into a plurality of sub-regions corresponding to a foreground region that includes an object of interest region and a plurality of sub-regions corresponding to a background region that does not include the object of interest region, and in the generating of the sub-video stream, a foreground sub-video stream may be generated by the plurality of sub-regions included in the foreground region, and a background sub-video stream may be generated by the plurality of sub-regions included in the background region.

When the background sub-video stream is generated, a quantization coefficient of the background sub-video stream may be set to be greater than a quantization coefficient of the foreground sub-video stream.

In the selecting of the one or more video frames from among the plurality of video frames, a first video frame may be selected as an $N^{th}$ video frame, a second video frame may be selected as an $(N+1)^{th}$ video frame, and when similarity value between the first video frame and the second video frame is a predetermined threshold value or more, a quantization coefficient of a second sub-video stream generated by the second video frame may be set to be greater than a quantization coefficient of a first sub-video stream generated by the first video frame.

The video data processing method may further include transmitting a summary image including the one or more selected video frames to a monitoring server, wherein size of area of each video frame in the summary image may be determined according to an importance of each video frame.

According to another aspect of the present disclosure, there is provided a program stored in a recording medium to allow a computer to perform the video data processing method.

According to still another aspect of the present disclosure, there is provided a video data processing device. The video data processing device includes a memory configured to store input data, and a processor coupled to the memory, wherein the processor is configured to perform operations of storing data of a video captured by a camera, selecting one or more video frames from among a plurality of video frames constituting at least a portion of the stored video data, dividing the one or more selected video frames into a plurality of sub-regions, and arranging the plurality of sub-regions according to a predetermined arrangement order and generating a sub-video stream, which includes the plurality of arranged sub-regions as a plurality of sub-video frames.

BRIEF DESCRIPTION OF THE DRAWINGS

The above and other objects, features and advantages of the present disclosure will become more apparent to those of ordinary skill in the art by describing examples thereof in detail with reference to the accompanying drawings, in which.

DETAILED DESCRIPTION

Figure 1:
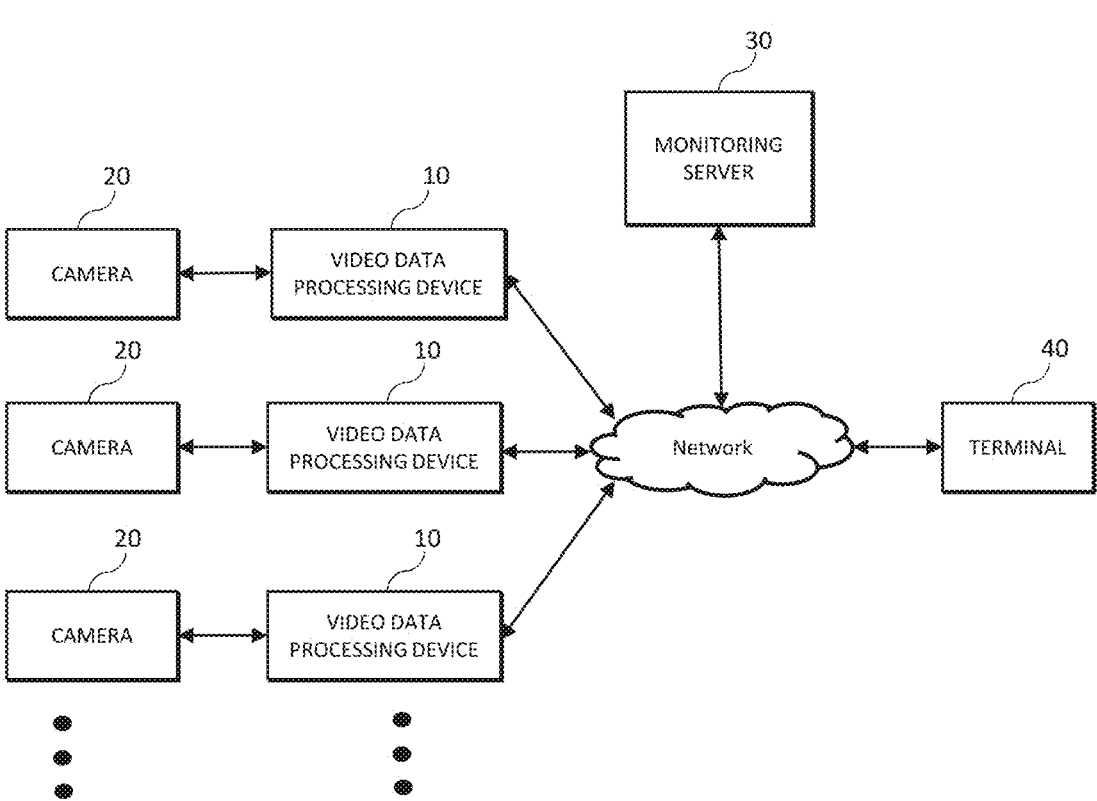
FIG. 1 is a diagram illustrating connection relationships between a video data processing device and other components according to the present disclosure.

Specific structural or step-by-step descriptions of the present disclosure are merely for describing examples according to the concept of the present disclosure. Therefore, the concept of the present disclosure may be implemented in various forms. The present disclosure should not be construed as limited to the examples of the present disclosure.

While the present disclosure is open to various modifications and alternative forms, specific examples thereof are shown by way of example in the accompanying drawings and will herein be described in detail. However, it should be understood that there is no intent to limit the present disclosure to the particular forms disclosed, and on the contrary, the present disclosure is to cover all modifications, equivalents, and alternatives falling within the spirit and scope of the present disclosure.

It will be understood that, although the terms "first," "second," etc., may be used herein to describe various components, these components should not be limited by these terms. These terms are used only to distinguish one component from another component. For example, a first component could be termed a second component, and similarly, a second component could be termed a first component without departing from the scope of the present disclosure.

It should be understood that when a first component is referred to as being "connected" or "coupled" to a second component, the first component may be directly connected or coupled to the second component. However, it should be understood that other components may be present among a plurality of components. In contrast, when a component is referred to as being "directly connected" or "directly coupled" to another component, there are no intervening components present. Other words used to describe the relationship between components should be interpreted in a like fashion (i.e., "between" versus "directly between," "adjacent" versus "directly adjacent," and the like).

The terminology used herein is for the purpose of describing particular examples only and is not intended to be limiting to the present disclosure. As used herein, the singular forms "a" and "an" are intended to also include the plural forms, unless the context clearly indicates otherwise. It should be further understood that the terms "comprise," "comprising," "include," and/or "including" used herein specify the presence of stated features, integers, steps, operations, components, parts, or combinations thereof, but do not preclude the presence or addition of one or more other features, integers, steps, operations, components, parts, or combinations thereof.

Unless otherwise defined, all terms including technical and scientific terms used herein have the same meaning as commonly understood by one of ordinary skill in the art to which the present disclosure belongs. It should be further understood that terms, such as those defined in commonly used dictionaries, should be interpreted as having a meaning that is consistent with their meaning in the context of the relevant art and are not to be interpreted in an idealized or overly formal sense unless expressly so defined herein.

In describing the present disclosure, descriptions of technical content that is well known in the technical field to which the present disclosure belongs and that are not directly related to the present disclosure will be omitted. This is to convey the gist of the present disclosure more clearly without obscuring it by omitting unnecessary explanation.

Hereinafter, the present disclosure will be described in detail by describing the present disclosure with reference to the accompanying drawings.

FIG. 1 is a diagram illustrating connection relationships between a video data processing device and other components according to the present disclosure.

Referring to FIG. 1, a video data processing device 10 may be connected to a camera 20 and receive, store, and process data of a video captured by the camera 20. The video data processing device 10 may be connected to one camera 20 or to a plurality of camera 20.

The video data processing device 10 may be connected to a monitoring server 30 through a network. The video data processing device 10 may process the data of the video captured by the camera 20 to generate transmission data and transmit the generated transmission data to the monitoring server 30. The monitoring server 30 may process the transmission data to restore the data of the video captured by the camera 20 or some video frames constituting the video data.

A terminal 40 used by a user or administrator may be connected to the monitoring server 30 through a network. The terminal 40 may receive and view the data of the video captured by the camera 20, some video frames constituting the video data, or the like from the monitoring server 30.

The camera 20 may photograph a monitoring target region to obtain video data for the monitoring target region. The camera 20 may photograph the monitoring target region in real time for surveillance or security purposes. The camera 20 may be a pan-tilt-zoom (PTZ) camera capable of panning and tilting and with an adjustable zoom ratio of a lens thereof. The camera 20 may be provided as a plurality of cameras.

The camera 20 may be a low-power camera driven using a battery. The low-power camera normally maintains a sleep mode and periodically wakes up to check whether an event has occurred. The low-power camera enters an active mode when an event occurs and returns to the sleep mode when no event occurs. In this way, the low-power camera may maintain the active mode only when an event occurs, thereby reducing power consumption.

The cameras 20 may communicate with network devices using various communication methods such as a wired or wireless local area network (LAN), Wi-Fi, ZigBee, Bluetooth, near-field communication, etc. For example, the cameras 20 may communicate with each other according to a low-power wireless communication protocol using radio frequencies in industrial-scientific-medical (ISM) bands.

The video data processing device 10 may store the video data received from the camera 20 and provide the stored video data or transmission data obtained by processing the video data to the monitoring server 30 through the network. The video data processing device 10 may be a digital video recorder, a network video recorder, etc., but the present disclosure is not limited thereto.

The network may include a wired network or a wireless network. The wireless network may be a $2^{nd}$ generation (2G) or $3^{rd}$ generation (3G) cellular communication system, a $3^{rd}$ Generation Partnership Project (3GPP), a $4^{th}$ generation (4G) communication system, Long-Term Evolution (LTE), World Interoperability for Microwave Access (WiMAX), etc.

The terminal 40 may include a terminal used by an administrator or user of the monitoring server 30. The terminal 40 may access the monitoring server 30 through the network and receive and process monitoring data provided by the monitoring server 30.

The video data processing device 10 may be implemented as a single physical device or implemented by organically combining a plurality of physical devices. The video data processing device 10 may be configured as a device integrated with the camera 20.

Figure 2:
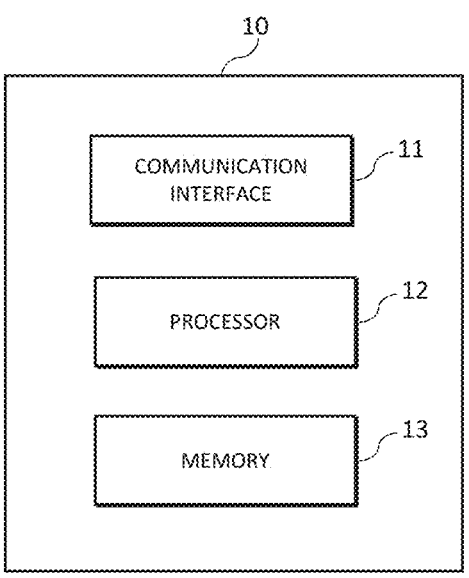
FIG. 2 is a block diagram illustrating a configuration of the video data processing device according to the present disclosure.

FIG. 2 is a block diagram illustrating a configuration of the video data processing device according to the present disclosure.

Referring to FIG. 2, the video data processing device 10 may include a communication interface 11, a processor 12, and a memory 13.

The communication interface 11 may receive videos from the plurality of cameras 20. The communication interface 11 may be configured to transmit the transmission data, which is generated by processing the video data in the video data processing device 10, to the monitoring server 30 through the network.

The processor 12 may select one or more video frames from among a plurality of video frames constituting at least a portion of the data of the video captured by the camera 20, and divide the one or more selected video frames into a plurality of sub-regions. The processor 12 may arrange the plurality of sub-regions according to a predetermined arrangement order and generate a sub-video stream, which includes the plurality of arranged sub-regions as a plurality of sub-video frames.

The memory 13 may be configured to store input data including the video data obtained from the camera 20. The memory 13 may be configured to store the data generated while the processor 12 processes the video frame and store the sub-video stream generated by the processor 12.

Figure 3:
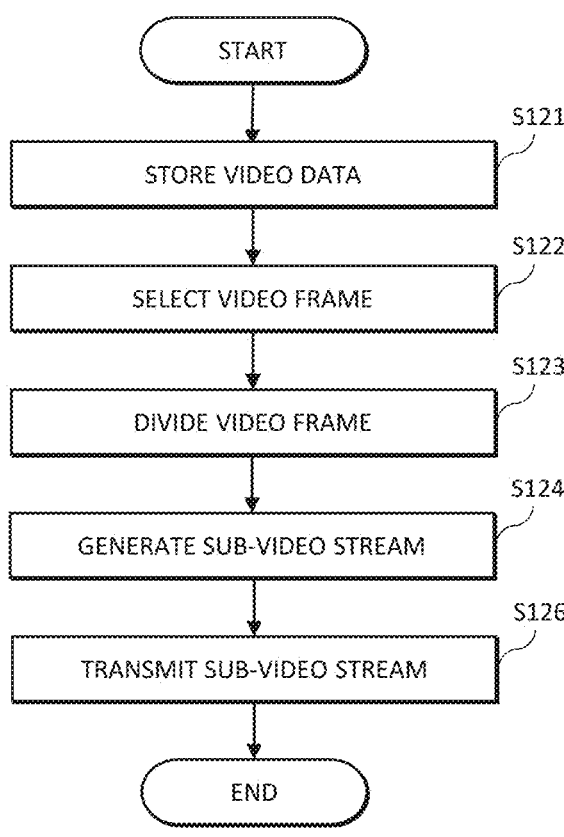
FIG. 3 is a flowchart illustrating a video data processing method performed by the video data processing device according to the present disclosure.

FIG. 3 is a flowchart illustrating a video data processing method performed by the video data processing device according to the present disclosure.

Referring to FIG. 3, the video data processing method may include a video data storage operation S121, a video frame selection operation S122, a video frame division operation S123, a sub-video stream generation operation S124, and a sub-video stream transmission operation S126.

In the video data storage operation S121, the video data processing device 10 may store data of a video captured by the camera 20. The data of the video captured by the camera 20 may be a video stream including a predetermined number of captured images (video frames) per second. For example, video data including 30 frames per second may include 30 captured images (video frames) per second, and video data including 60 frames per second may include 60 captured images (video frames) per second.

In the video frame selection operation S122, the video data processing device 10 may select one or more video frames from among a plurality of video frames constituting at least a portion of the stored video data.

A plurality of video frames (captured images) captured at predetermined time intervals may be selected. For example, video frames captured at intervals of 30 seconds may be selected or video frames captured at determined time intervals of one minute or more may be selected.

In another example, a best shot may be selected. The best shot may be an object image with a highest object identification score calculated based on a size of a region occupied by the object and an orientation and sharpness of the object. For example, as the number of pixels occupied by the object image is increased among the data on images captured by the camera 20, the orientation of the object is toward the front of the camera, or the object image is clearer, the object identification score indicating the degree to which the object may be identified may be increased. The video data processing device 10 may determine the image with the highest object identification score as the best shot and select the determined best shot as a transmission target.

An event detection shot may include an image captured upon detecting a preset event. For example, it is assumed that an event for detecting a vehicle passing a crosswalk in the case of a crosswalk walk signal (green signal) is preset. When the vehicle traveling on the crosswalk is detected in a pedestrian signal, the captured image captured by the camera 20 may be provided as the event detection shot.

When the captured images (video frames) are selected at a predetermined time period and the selected captured images are processed and transmitted to the monitoring server 30, the amount of data transmitted to the monitoring server 30 may be significantly reduced. The time period for the video frame may vary depending on the situation and environment of a monitoring target region. For example, the camera 20 that photographs a road where objects move a lot may be set to select video frames at relatively short time intervals (e.g., 5 seconds or the like), and the camera 20 that photographs a park where objects move little may be set to select video frames at long time intervals (e.g., 30 seconds or the like).

In the video frame division operation S123, the video data processing device 10 may divide the one or more selected video frames into a plurality of sub-regions. All the divided sub-regions may have the same size. For example, the one or more selected video frames may be divided into sub-regions of the same number horizontally and vertically, such as 4, 9, 16, 25, etc. Further, in another example, the one or more selected video frames may be divided into sub-regions of different numbers horizontally and vertically. The number of divisions into sub-regions is not limited to the above-described examples.

In the sub-video stream generation operation S124, the video data processing device 10 may arrange the plurality of sub-regions according to a predetermined arrangement order and generate a sub-video stream, which includes the plurality of arranged sub-regions as a plurality of sub-video frames. In an example of disclosure, the arrangement order may be assigned sequentially from an upper left sub-region of the video frame to a lower right sub-region of the video frame. In another example, the similarity value between the sub-regions may be calculated and the arrangement order may be assigned to each sub-region according to the similarity value.

The sub-video stream may be generated using the plurality of sub-regions arranged according to the arrangement order. The sub-video stream may be generated by encoding the plurality of arranged sub-regions using a video codec including Moving Picture Experts Group (MPEG)-2, H.264, High Efficiency Video Coding (HEVC), Versatile Video Coding (VVC), etc.

In the sub-video stream transmission operation S126, the video data processing device 10 may transmit the generated sub-video stream to the monitoring server. The monitoring server 30 may process the transmitted sub-video stream and restore the video frame selected from among the plurality of sub-regions included in the sub-video stream. The arrangement order of the sub-regions may be included in the transmission data transmitted to the monitoring server 30, and the monitoring server 30 may determine the arrangement order of the plurality of sub-regions on the basis of the transmitted arrangement order and restore the selected video frame.

Figure 4:
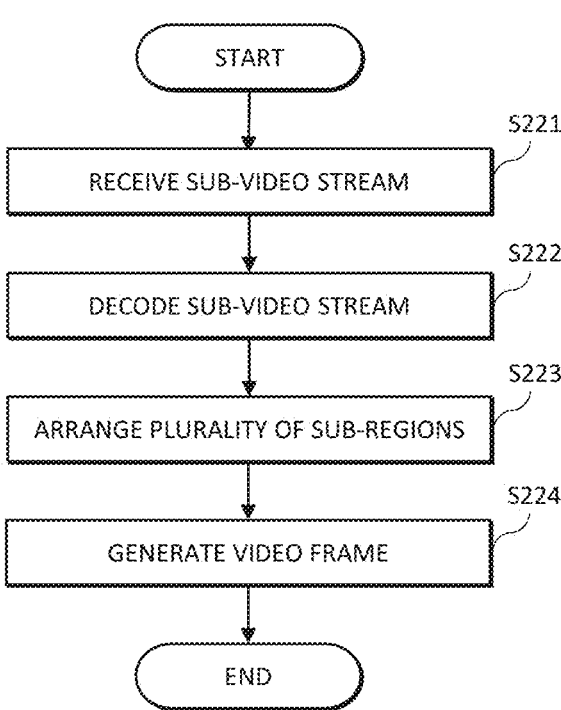
FIG. 4 is a flowchart illustrating a video data processing method performed by a monitoring server according to the present disclosure.

FIG. 4 is a flowchart illustrating a video data processing method performed by the monitoring server according to the present disclosure.

Referring to FIG. 4, the monitoring server 30 may receive a sub-video stream transmitted from the video data processing device 10 (operation S221). Since the received video stream was encoded using a video codec including MPEG-2, H.264, HEVC, VVC, etc., the sub-video stream may be decoded using the corresponding video codec (operation S222). A plurality of sub-regions may be extracted by decoding the sub-video stream, and the plurality of sub-regions may be arranged according to a predetermined arrangement order or an arrangement order included in transmission data (operation S223). When the plurality of sub-regions are arranged according to the arrangement order within a video frame, the selected video frame may be obtained by the video data processing device 10.

Figure 5:
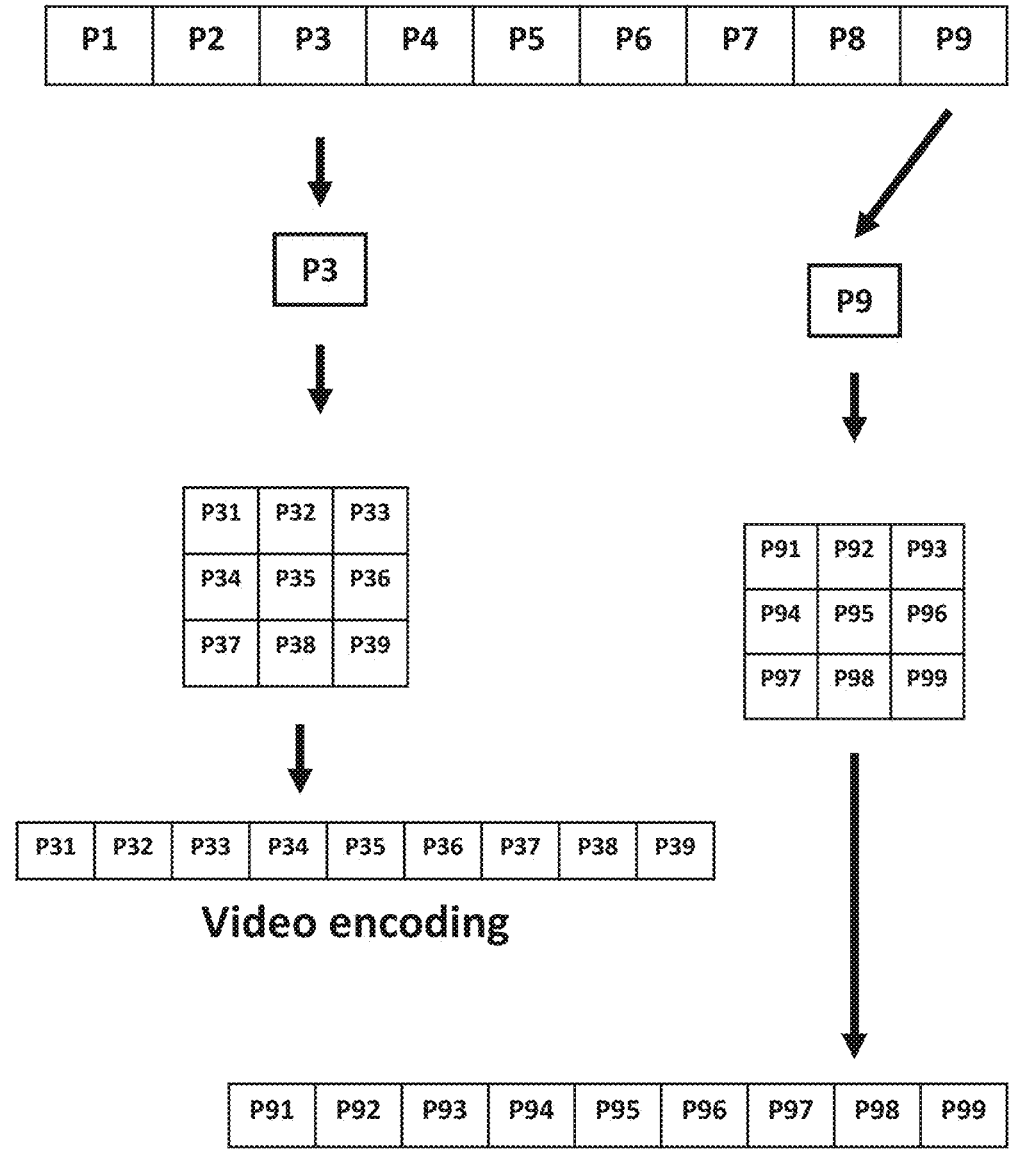
FIG. 5 is a diagram illustrating an example of the video data processing method according to the present disclosure.

FIG. 5 is a diagram illustrating an example of the video data processing method according to the present disclosure.

Data of a video captured by the camera 20 may include a plurality of video frames P1 to P9 (captured image or captured pictures). Two video frames P3 and P9 including at least one of a determined time interval, a best shot, and an event detection shot may be selected from among the plurality of video frames P1 to P9.

The selected video frames P3 and P9 may be divided into a plurality of sub-regions P31 to P39 and a plurality of sub-regions P91 to P99, respectively. In the present disclosure, the video frame may be divided into nine sub-regions, but the present disclosure is not limited thereto.

The plurality of divided sub-regions P31 to P39 and P91 to P99 may be arranged according to a predetermined arrangement order. In the present disclosure, an example in which the arrangement order is assigned sequentially from an upper left sub-region of the video frame to a lower right sub-region of the video frame is described, but the present disclosure is not limited thereto.

A sub-video stream, which includes a plurality of sub-regions as a plurality of video frames (sub-video frames), may be generated through video encoding. The sub-video stream may be generated using a video codec including MPEG-2, H.264, HEVC, VVC, etc. The generated sub-video stream may be transmitted to the monitoring server 30. The monitoring server 30 may process the transmitted sub-video stream and obtain the selected video frames P3 and P9.

Figure 6:
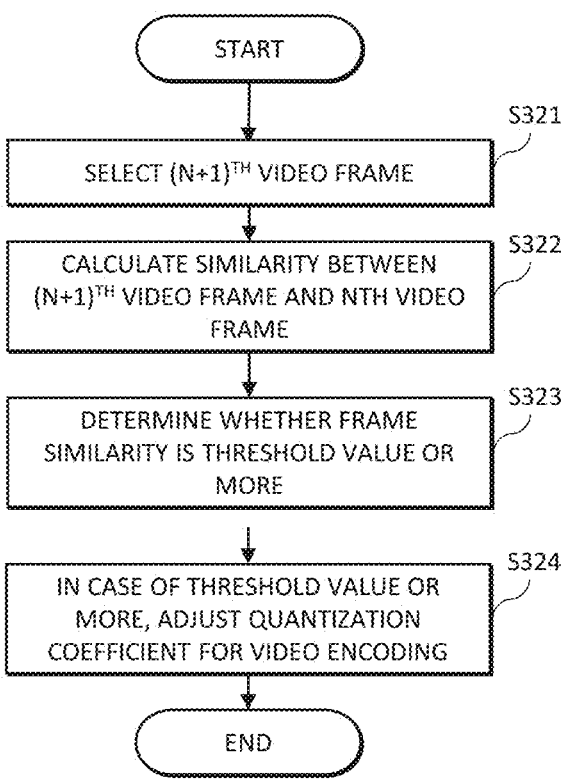
FIG. 6 is a flowchart for describing an example of a process for adjusting a quantization coefficient according to similarity value between video frames according to the present disclosure.

FIG. 6 is a flowchart for describing an example of a process for adjusting a quantization coefficient according to similarity value between video frames according to the present disclosure.

In the present example, a quantization coefficient used when a video frame is encoded is compared to that of another video frame and adjusted. First, an $(N+1)^{th}$ video frame is selected (operation S321). A video frame selected immediately before the $(N+1)^{th}$ video frame is selected is an $N^{th}$ video frame.

The similarity value between the selected $(N+1)^{th}$ video frame and the $N^{th}$ video frame may be calculated (operation S322). The similarity value between video frames may be calculated by values obtained by measuring a color histogram difference, a motion vector difference, an edge change ratio, the similarity value of detected objects, etc.

Thereafter, whether the similarity value between the video frames is a threshold value or more may be determined (operation S323). When the same objects are located in the same region and there is no change in background region other than the same region, the threshold value may be set so that the similarity value between the video frames is the threshold value or more.

When the similarity value between the video frames is the threshold value or more, a quantization coefficient for a video encoding used when the sub-video stream for the $(N+1)^{th}$ video frame is generated may be adjusted to be greater than or equal to a quantization coefficient for a video encoding used when the sub-video stream for the $N^{th}$ video frame is generated. When the quantization coefficient increases, the image quality is degraded, and when the quantization coefficient decreases, the image quality is improved.

Quantization refers to an operation of dividing frames with predetermined intervals and expressing the frames in predetermined intervals as discrete values using a transformation coefficient expressed as an arbitrary value. The quantization methods include methods such as scalar quantization, vector quantization, etc. A simple quantization method is performed by a process of dividing a transformation coefficient by a corresponding value in a quantization table and then rounding the divided transformation coefficient to the nearest integer.

Figure 7:
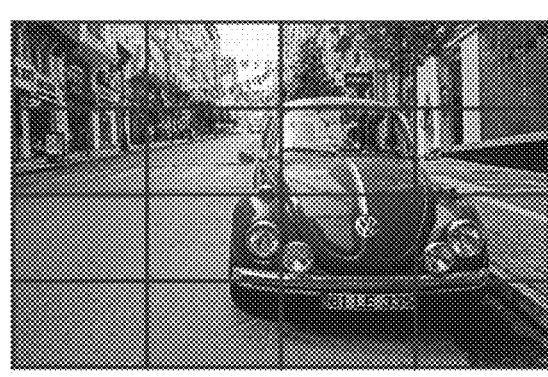
FIG. 7 is a diagram showing an example of the video data processing method according to the present disclosure.
Figure 7:
Figure 7:
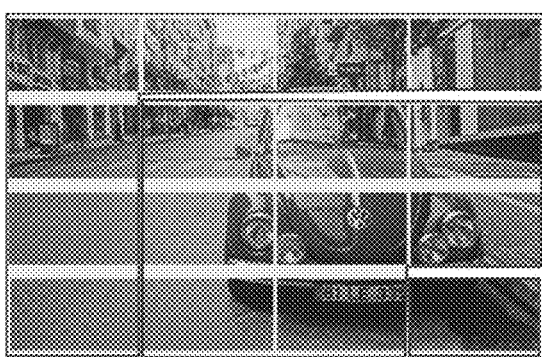
Figure 7:
Figure 7:
Figure 7:

FIG. 7 is a diagram showing an example of the video data processing method according to the present disclosure.

FIG. 7 shows an example in which a video frame obtained by capturing a parked vehicle and a road is selected. The selected video frame may be divided into 16 sub-regions.

When an object of interest is preset to be a vehicle, a foreground region that includes the vehicle, which is the object of interest, may be set among the divided 16 sub-regions. The foreground region may include 8 sub-regions in which the vehicle appears.

A background region that does not include the vehicle, which is the object of interest, may be set among the divided 16 sub-regions. The background region may include 8 sub-regions in which the vehicle does not appear.

The 8 sub-regions that are set as the background region may be arranged in a predetermined arrangement order and encoded by a video codec. Further, the 8 sub-regions that are set as the foreground region may be arranged in a predetermined arrangement order and encoded by the video codec. A background sub-video stream generated by the background region and a foreground sub-video stream generated by the foreground region may be transmitted to the monitoring server 30.

The monitoring server 30 may obtain the background region and foreground region from the transmitted background sub-video stream and foreground sub-video stream. The monitoring server 30 may check the arrangement order of each sub-region from transmission data including the arrangement order of each sub-region, arrange a plurality of sub-regions according to the arrangement order, and restore the video frame obtained by capturing the parked vehicle and the road.

Figure 8:
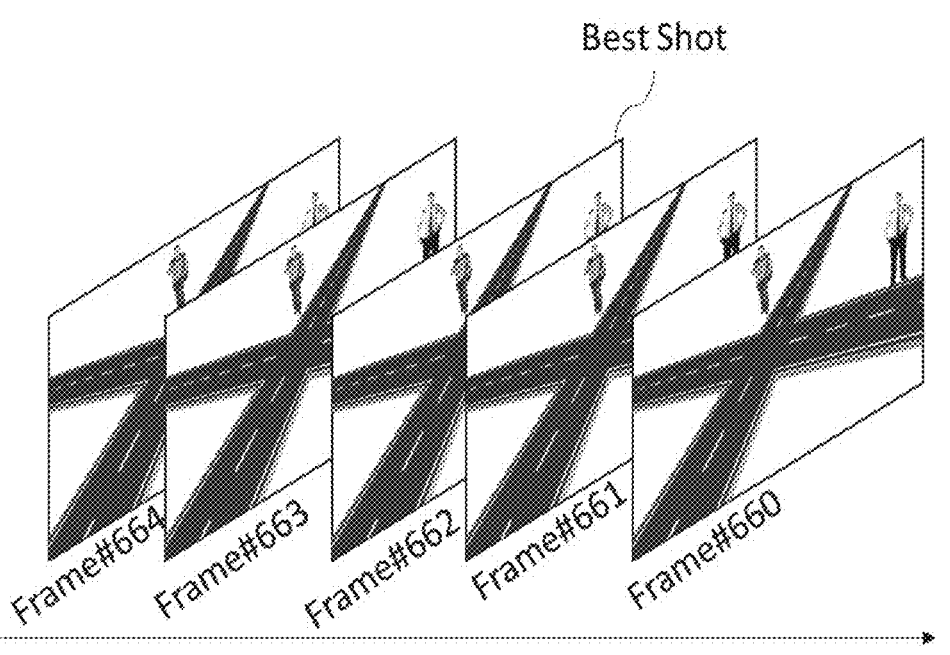
FIG. 8 is a diagram for describing a best shot according to the present disclosure.

FIG. 8 is a diagram for describing a best shot according to the present disclosure.

A video captured by the camera 20 may include a plurality of frames (pictures). The plurality of frames may include an object image captured at each time point. A best shot is an image that can best identify an object. An object identification score may indicate the degree to which an object can be identified, and as the number of pixels occupied by the object image is increased, an orientation of the object is toward the front of the camera, or the object image is clearer, the object identification score may be increased.

Figure 9:
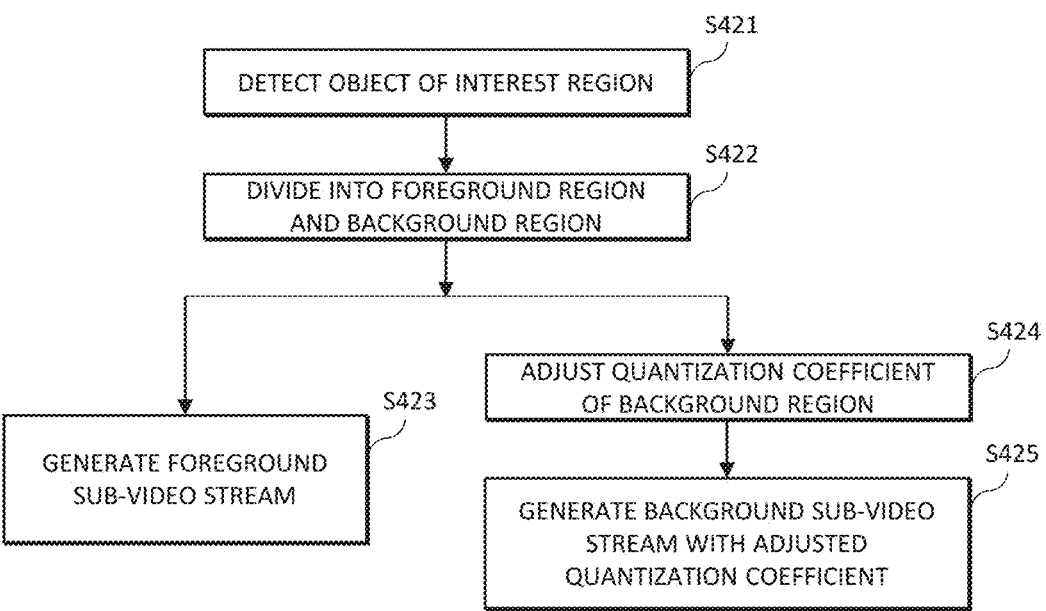
FIG. 9 is a flowchart for describing a process for adjusting a quantization coefficient for a background region according to the present disclosure.

FIG. 9 is a flowchart for describing a process for adjusting a quantization coefficient for a background region according to the present disclosure.

An object of interest region may be detected from a selected video frame (operation S421). The selected video frame may be divided into a plurality of sub-regions, and the plurality of sub-regions may be divided into a plurality of sub-regions corresponding to a foreground region that includes the object of interest region and a plurality of sub-regions corresponding to a background region that does not include the object of interest region (operation S422).

A foreground sub-video stream may be generated for the plurality of sub-regions corresponding to the foreground region (operation S423). A quantization coefficient of the plurality of sub-regions corresponding to the background region may be adjusted to be greater than or equal to a quantization coefficient of the plurality of sub-regions corresponding to the foreground region (operation S424). A background sub-video stream may be generated with the quantization coefficient adjusted for the plurality of sub-regions corresponding to the background region (operation S425).

Figure 10:
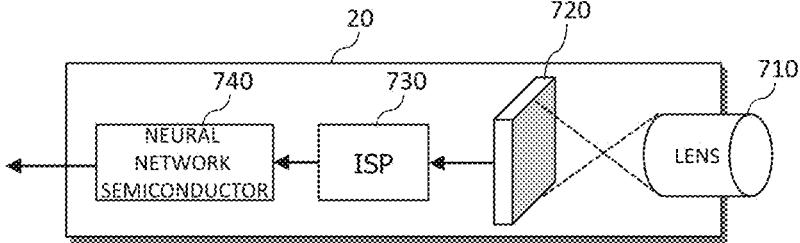
FIG. 10 is an exemplary diagram for describing a configuration of a camera according to the present disclosure.

FIG. 10 is an exemplary diagram for describing a configuration of a camera according to the present disclosure.

Referring to FIG. 10, the camera 20 may include a lens 710, an image sensor 720, an image signal processor (ISP) 730, and an artificial neural network semiconductor 740. The artificial neural network semiconductor 740 may have object detection and object classification functions.

When object and background images are captured by the camera 20, image data of the object and background may be obtained by the image sensor 720 through the lens 710. The obtained image data may be processed through the ISP 730, and the processed image data may be input to the artificial neural network semiconductor 740. The artificial neural network semiconductor 740 may detect an object from the input image data and generate information related to the object as additional information.

Figure 11:
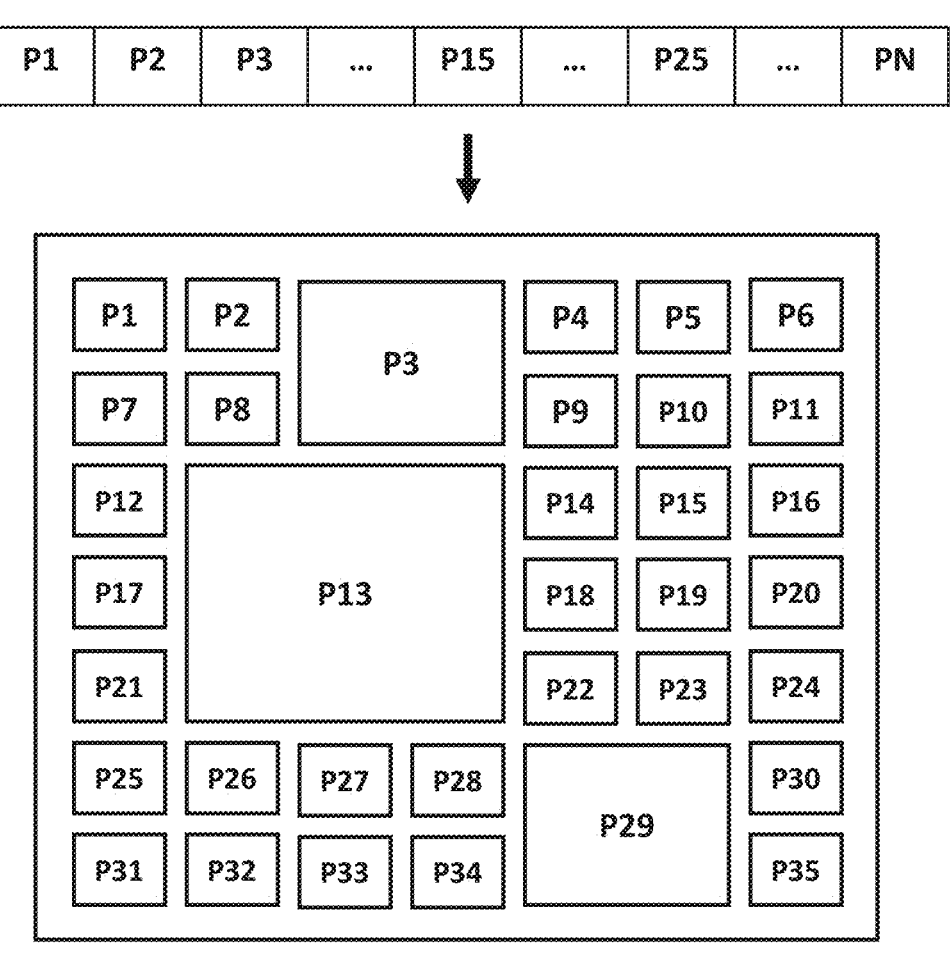
FIG. 11 is a diagram illustrating an example of a summary image of video frames according to the present disclosure.

FIG. 11 is a diagram illustrating an example of a summary image of video frames according to the present disclosure.

When a plurality of video frames P1 to PN are selected from video data, the video data processing device 10 may generate a summary image including the plurality of selected video frames P1 to PN and transmit the generated summary image to the monitoring server 30. In another example, the monitoring server 30 may restore the plurality of selected video frames P1 to PN, then generate a summary image, and provide the generated summary image to the terminal 40.

An arrangement order of the video frames in the summary image may be determined according to a time order of the video frames. For example, when the time order of the selected video frames is that the video frame P1 is the earliest and the video frame P35 is the latest, the video frame P1 may be placed first and the video frame P35 may be placed last in the summary image.

Size of area of the video frame in the summary image may be determined according to an importance score of each video frame. The importance score may be calculated based on the duration of similar video frames, whether the video frames are related to event detection, etc. Since the importance of monitoring may vary depending on the capturing time of video data related to the corresponding video frame, whether the video frame is related to an event set by the user, etc., the size of area of the video frame may be determined according to the importance score determined in this way.

When the video frame P3 has two times the duration (time for which the same or similar scene continues) in the video data compared to other video frames P1, P2, etc., the sides of video frame P3 may have two times the length of sides of each of other video frames P1, P2, etc., as shown in FIG. 11.

When the video frame P13 is an event detection shot, the summary image may be configured to have length of sides three times that of each of other video frames P1, P2, etc., that are not related to the event. Further, when the video frame P29 is a best shot of a specific object, the summary image may be configured to have length of sides two times that of each of the video frames P1, P2, etc. The areas of the event detection shot and best shot in the summary image may be preset by the user and are not limited to the example shown in FIG. 11.

The summary image may be provided to the terminal 40 through the monitoring server 30. In order to check a detailed video from the plurality of video frames or summary image provided through the monitoring server 30, the user may select a specific video frame or a specific video frame in the summary image, and request the detailed video. When there is a request for the detailed video from the user, the monitoring server 30 may obtain video stream data at predetermined time intervals that includes the video frame requested from the video data processing device 10, and provide the obtained video stream to the terminal 40.

According to the present disclosure, when video data of CCTV cameras is transmitted, a transmission bandwidth can be reduced.

Further, according to the present disclosure, when video data of CCTV cameras is transmitted, a detailed video can be provided through a reduced transmission bandwidth according to a user request.

The present disclosure disclosed in this specification and drawings are only examples to aid understanding of the technical content of the present disclosure and the present disclosure is not limited thereto. It is clear to those skilled in the art that various modifications based on the technological scope of the present disclosure in addition to the examples disclosed herein can be made.

What is claimed is:

1. A method for processing video data, comprising:
storing data of a video captured by a camera;
selecting one or more video frames from among a plurality of video frames constituting at least a portion of the stored video data;
dividing the one or more selected video frames into a plurality of sub-regions, wherein the sub-regions are divided regions of a single frame;
arranging the plurality of sub-regions according to a predetermined arrangement order and generating a sub-video stream, which includes the plurality of arranged sub-regions as a plurality of sub-video frames; and
wherein the plurality of sub-regions are classified into a plurality of sub-regions corresponding to a foreground region that includes an object of interest region and a plurality of sub-regions corresponding to a background region that does not include the object of interest region.

2. The method of claim 1, further comprising:
transmitting the generated sub-video stream to a monitoring server.

3. The method of claim 1, wherein, in the selecting of the one or more video frames from among the plurality of video frames, the selected video frame includes one or more best shots.

4. The method of claim 3, wherein the best shot includes an image of an object with the highest object identification score calculated based on a size of a region occupied by the object and an orientation and sharpness of the object.

5. The method of claim 1, wherein, in the selecting of the one or more video frames from among the plurality of video frames, the selected video frame includes one or more event detection shots.

6. The method of claim 5, wherein the event detection shot includes an image captured upon detecting a preset event.

7. The method of claim 1, wherein, in the selecting of the one or more video frames from among the plurality of video frames, the selected video frame includes a plurality of video frames captured at predetermined time intervals.

8. The method of claim 1, wherein in the generating of the sub-video stream, a foreground sub-video stream is generated by the plurality of sub-regions included in the foreground region, and a background sub-video stream is generated by the plurality of sub-regions included in the background region.

9. The method of claim 8, wherein, as the background sub-video stream is generated, a quantization coefficient of the background sub-video stream is set to be greater than a quantization coefficient of the foreground sub-video stream.

10. The method of claim 1, wherein, in the selecting of the one or more video frames from among the plurality of video frames, a first video frame is selected as an $N^{th}$ video frame, and a second video frame is selected as an $(N+1)^{th}$ video frame.

11. The method of claim 10, wherein as similarity value between the first video frame and the second video frame is a predetermined threshold value or more, a quantization coefficient of a second sub-video stream generated by the second video frame is set to be greater than a quantization coefficient of a first sub-video stream generated by the first video frame.

12. A method for processing video data, comprising:
storing data of a video captured by a camera;
selecting one or more video frames from among a plurality of video frames constituting at least a portion of the stored video data;
dividing the one or more selected video frames into a plurality of sub-regions, wherein the sub-regions are divided regions of a single frame;
arranging the plurality of sub-regions according to a predetermined arrangement order and generating a sub-video stream, which includes the plurality of arranged sub-regions as a plurality of sub-video frames; and
further comprising transmitting a summary image including the one or more selected video frames to a monitoring server,
wherein size of area of each video frame in the summary image is determined according to an importance score of each video frame.

13. A device for processing video data, comprising:
a memory configured to store input data; and
a processor coupled to the memory,
wherein the processor is configured to perform operations of:
storing data of a video captured by a camera;
selecting one or more video frames from among a plurality of video frames constituting at least a portion of the stored video data;
dividing the one or more selected video frames into a plurality of sub-regions wherein the sub-regions are divided regions of a single frame;
arranging the plurality of sub-regions according to a predetermined arrangement order and generating a sub-video stream, which includes the plurality of arranged sub-regions as a plurality of sub-video frames; and
wherein the plurality of sub-regions are classified into a plurality of sub-regions corresponding to a foreground region that includes an object of interest region and a plurality of sub-regions corresponding to a background region that does not include the object of interest region.

14. The device of claim 13, wherein, in the selecting of the one or more video frames from among the plurality of video frames, the selected video frame includes one or more best shots.

15. The device of claim 14, wherein the best shot includes an image of an object with a highest object identification score calculated based on a size of a region occupied by the object and an orientation and sharpness of the object.

16. The device of claim 13, wherein, in the selecting of the one or more video frames from among the plurality of video frames, the selected video frame includes one or more event detection shots.

17. The device of claim 16, wherein the event detection shot includes an image captured upon detecting a preset event.

18. The device of claim 13, wherein, in the selecting of the one or more video frames from among the plurality of video frames, the selected video frame includes a plurality of video
frames captured at predetermined time intervals.

* * * * *